United States Patent
Yuk et al.

(10) Patent No.: US 8,971,354 B2
(45) Date of Patent: Mar. 3, 2015

(54) METHOD FOR GENERATING A CARRIER GROUP AND METHOD FOR TRANSMITTING CARRIER GROUP INFORMATION

(75) Inventors: Young Soo Yuk, Anyang-si (KR); Yong Ho Kim, Anyang-si (KR); In Uk Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 13/003,291

(22) PCT Filed: Jul. 8, 2009

(86) PCT No.: PCT/KR2009/003734
§ 371 (c)(1),
(2), (4) Date: May 6, 2011

(87) PCT Pub. No.: WO2010/005233
PCT Pub. Date: Jan. 14, 2010

(65) Prior Publication Data
US 2011/0211541 A1    Sep. 1, 2011

Related U.S. Application Data

(60) Provisional application No. 61/079,111, filed on Jul. 8, 2008, provisional application No. 61/079,812, filed on Jul. 11, 2008.

(51) Int. Cl.
*H04J 1/06* (2006.01)
*H04L 5/00* (2006.01)
*H04L 25/03* (2006.01)

(52) U.S. Cl.
CPC .............. *H04L 5/0094* (2013.01); *H04L 5/001* (2013.01); *H04L 5/0037* (2013.01); *H04L 5/0064* (2013.01); *H04L 25/03834* (2013.01)
USPC .......................................... 370/482; 370/485

(58) Field of Classification Search
USPC ......... 370/310, 312, 329, 431, 464, 482, 495, 370/496
See application file for complete search history.

(56) References Cited

U.S. PATENT DOCUMENTS 6,563,806 B1 * 5/2003 Yano et al. .................... 370/330
6,606,485 B1 * 8/2003 Chen et al. .................... 455/140

(Continued)

FOREIGN PATENT DOCUMENTS

JP    2010-516160    5/2010

OTHER PUBLICATIONS

Kenneth Stanwood et al., "Proposal to include Channel Aggregation in 82.16m SDD", IEEE C802.16m-07/315, Nov. 2007.

(Continued)

*Primary Examiner* — Curtis A Alia
(74) *Attorney, Agent, or Firm* — Lee, Hong, Degerman, Kang & Waimey

(57) ABSTRACT

Disclosed are: a variety of methods and apparatuses for aggregating a plurality of carriers and using the carrier aggregation in a wireless connection system; and a variety of methods and apparatuses for providing information on the structure of a carrier generated by aggregating a plurality of carriers. A method for transmitting and receiving carrier group information, according to one embodiment of the present invention, includes the steps of: a mobile terminal transmitting a first message containing multi-carrier performance information of the mobile terminal to a base station; and the mobile terminal receiving, from the base station, a second message containing allocation information on the wireless resource allocated on the basis of the multi-carrier information. Here, multi-carrier performance information includes a spectral mask-type parameter for the supportable multi-carrier of the mobile terminal.

24 Claims, 13 Drawing Sheets

(56) References Cited

U.S. PATENT DOCUMENTS

| | | | |
|---|---|---|---|
| 7,756,099 B2 * | 7/2010 | Tao et al. | 370/344 |
| 7,808,883 B2 * | 10/2010 | Green | 370/208 |
| 2004/0240535 A1 * | 12/2004 | Verma et al. | 375/222 |
| 2005/0195909 A1 | 9/2005 | Hwang et al. | |
| 2006/0146856 A1 * | 7/2006 | Jung et al. | 370/431 |
| 2007/0009054 A1 * | 1/2007 | Kwak et al. | 375/260 |
| 2007/0072628 A1 * | 3/2007 | Kang et al. | 455/458 |
| 2008/0039090 A1 * | 2/2008 | Jin et al. | 455/436 |
| 2008/0119194 A1 | 5/2008 | Kim et al. | |
| 2008/0300002 A1 * | 12/2008 | Sheffer | 455/509 |
| 2009/0040970 A1 * | 2/2009 | Ahmadi et al. | 370/329 |
| 2010/0316026 A1 * | 12/2010 | Lee et al. | 370/336 |

OTHER PUBLICATIONS

Ken Stanwood et al., "Comments on new Multicarrier text in SDD", IEEE C802.16m-08/521, Jul. 2008.

Youngsoo Yuk et al., "The PRU Configuration for BW Aggregation", C802.16m-08/802, Jul. 2008.

* cited by examiner (a)

(b)

(a)

(b)

METHOD FOR GENERATING A CARRIER GROUP AND METHOD FOR TRANSMITTING CARRIER GROUP INFORMATION

CROSS-REFERENCE TO RELATED APPLICATIONS

This application is the National Stage filing under 35 U.S.C. 371 of International Application No. PCT/KR2009/003734, filed on Jul. 8, 2009, which claims the benefit of U.S. Provisional Application Ser. Nos. 61/079,812, filed on Jul. 11, 2008, and 61/079,111, filed on Jul. 8, 2008, the contents of all of which are incorporated by reference herein in their entirety.

BACKGROUND OF THE INVENTION

1. Field of the Invention

The present invention relates to a method and apparatus for aggregating a plurality of carriers in a wireless access system and using the aggregated carriers, and more particularly to a method and apparatus for providing information about a carrier structure formed by aggregating several carriers.

2. Discussion of the Related Art

A brief description of carriers will be given hereinbelow.

The amplitude, frequency, and/or phase of a sine wave or a periodic pulse wave may be modulated to include information. The sine wave or pulse wave serving to convey information is called a carrier.

Methods for modulating a carrier include single-carrier modulation (SCM) and multi-carrier modulation (MCM). SCM performs modulation such that all information is carried on a single carrier.

MCM divides an entire channel bandwidth of one carrier into subchannels having multiple narrow bandwidths and transmits multiple narrowband subcarriers through respective subchannels.

When using MCM, each subchannel may approximate to a flat channel due to a narrow bandwidth. A user may compensate for distortion of a channel using a simple equalizer. MCM may be implemented at a high speed using Fast Fourier Transform (FFT). Namely, MCM is favored over SCM during high-rate data transmission.

In the embodiments of the present invention, a multi-carrier system supporting broadband by aggregating one or more carriers is proposed. Specifically, the multi-carrier system, which will be described hereafter, uses carriers by aggregating one or more carriers, unlike the afore-mentioned MCM which uses carriers by segregating one carrier.

To efficiently use multiple bands or multiple carriers, a technique in which one medium access control (MAC) entity manages multiple carriers (e.g., multiple frequency carriers) has been proposed.

FIGS. 1(a) and 1(b) illustrate methods for transmitting and receiving signals based on a multi-band radio frequency (RF) scheme.

In FIGS. 1(a) and 1(b), one MAC layer in each of a transmitting end and a receiving end may manage multiple carriers to efficiently use the multiple carriers. To effectively transmit and receive the multiple carriers, it is assumed that both the transmitting end and the receiving end can transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIGS. 1(a) and 1(b), physical layers (PHY 0, PHY 1, ..., PHY n−2, and PHY n−1) represent multiple bands and each of the bands may have a frequency allocation (FA) band size allocated for a specific service according to a predetermined frequency policy. For example, PHY 0 (RF carrier 0) may have a frequency band size allocated for a general FM radio broadcast and PHY 1 (RF carrier 1) may have a frequency band size allocated for cellular phone communication.

Although each frequency band may have a different FA size depending on the characteristics thereof, it is assumed in the following description that each frequency carrier (FC) has a size of A MHz for convenience of explanation. Each frequency allocation (FA) band may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion. As in the recent $3^{rd}$ generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

In order to transmit a signal through multiple bands as shown in FIG. 1(a) as well as to receive a signal through multiple bands as shown in FIG. 1(b), it is necessary for a transceiver to include a Radio Frequency (RF) module that transmits and receives signals through multiple bands. In FIG. 1, a method for constructing the MAC layer "MAC" is decided by a base station (BS) irrespective of downlink (DL) and uplink (UL).

In brief, FIG. 1 shows signal transmission/reception technology for enabling one MAC entity (simply referred to as a MAC) to manage/operate a plurality of RF carriers. In addition, RF carriers managed by one MAC need not be contiguous to one another. Therefore, the above-mentioned signal transmission/reception technology of the present invention is more flexible in terms of resource management. However, according to user requirements or channel environment, a MAC entity for each carrier can manage/operate individual carriers as shown in FIG. 1.

FIG. 2 exemplarily shows a frequency allocation method for use in a carrier aggregation system.

In FIG. 2, frequency allocation bands (FA 0 to FA 7) may be managed by RFs (RF 0 to RF 7). In FIG. 2, it is assumed that FA 0, FA 2, FA 3, FA 6 and FA 7 have already been allocated to a specific conventional communication service. In the meantime, available RFs (RF 1(FA 1), RF 4(FA 4), and RF 5(FA 5)) can be effectively managed by one MAC (MAC #5). In this case, RF carriers constructing one MAC may not be contiguous to one another as described above, such that it is possible to more effectively manage frequency resources.

From the viewpoint of downlink, it is possible to use the following exemplary base station (BS)/mobile station (MS) scenario in association with the multi-band supporting scheme or the carrier integration scheme.

FIG. 3 shows an exemplary scenario for communicating between one BS and several MSs for use in a multi-band scheme.

In FIG. 3, it is assumed that MS 0 (or UE 0), MS 1 (or UE 1) and MS 2 (or UE 2) are multiplexed. BS 0 (or Node-B 0) may transmit a signal through a frequency band managed by carriers RF 0 and RF 1. In addition, MS 0 has throughput for receiving only RF 0, and MS 1 can receive both RF 0 and RF 1. In this case, MS 2 can receive signals of only RF 0 and RF 1 because the BS transmits only RF 0 and RF 1.

A general wireless communication system transmits data using one bandwidth (i.e., one carrier). In order to increase transmission capacity of RF data, a system bandwidth for use in a second generation mobile communication system has been extended to 200 KHz~1.25 MHz, and a system bandwidth for use in a third generation mobile communication system has been extended to 5 MHz~10 MHz.

In addition, the 3rd Generation Partnership Project Long Term Evolution (3GPP LTE) system or the Institute of Electrical and Electronics Engineers (IEEE) 802.16m system has attempted to extend system bandwidth up to 20 MHz.

In order to increase transmission (Tx) capacity of RF data, a method for increasing bandwidth is needed. However, it is necessary to support a large bandwidth even when a currently requested service is low in level, such that a large amount of power may be unavoidably consumed. In addition, the current system cannot be reused to support such requirements. In order to solve the above-mentioned problems, a multicarrier transmission method for simultaneously transmitting/receiving a plurality of bandwidths is an area of intense research. Recently, grouping one or more multicarriers is referred to as carrier aggregation.

However, a multiband-based communication scheme for use in a current mobile communication technology has been conceptually defined. If necessary, the multiband-based communication scheme may require further assignment of only a Frequency Assignment (FA).

Therefore, a multiplexing method and a multiplexed carrier aggregation structure to implement more efficient and higher-performance processing, and methods for transmitting/receiving information of a carrier aggregation structure need to be more specifically defined.

SUMMARY OF THE INVENTION

Accordingly, the present invention is directed to a method for performing a carrier aggregation and a method for transmitting carrier aggregation information that substantially obviate one or more problems due to limitations and disadvantages of the related art.

An object of the present invention is to provide a method for aggregating a plurality of carriers and using the aggregated carriers.

Another object of the present invention is to provide a method and apparatus for efficiently generating a carrier aggregation structure.

Another object of the present invention is to provide a method and apparatus for transmitting/receiving information of a carrier aggregation structure.

Another object of the present invention is to provide various methods and apparatuses for aggregating multiple carriers, various methods and apparatuses for providing information about a carrier structure formed by aggregation of multiple carriers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting/receiving carrier aggregation information includes transmitting, by a mobile station (MS), a first message including multicarrier capability (MC) information of the mobile station (MS), and receiving a second message including allocation information of a radio resource allocated on the basis of the multicarrier capability (MC) information from a base station (BS), wherein the multicarrier capability (MC) information includes a spectral mask shape parameter of multiple carriers capable of being supported by the mobile station (MS).

The method may further include receiving a multicarrier configuration index (MCI) related to a carrier aggregation supported by the base station (BS) from the base station (BS), and acquiring multicarrier configuration information supported by the base station (BS) on the basis of the multicarrier configuration index (MCI). The multicarrier configuration index (MCI) may include information about a total bandwidth of the carrier aggregation supported by the base station (BS), information about the number of sub-bands contained in the carrier aggregation, and configuration order information of the sub-bands. The multicarrier configuration information may include information about a total bandwidth of the carrier aggregation, information about the number of carriers contained in the carrier aggregation, and an intermediate frequency (IF) of the carrier aggregation. The spectral mask shape parameter may be decided as an effective bandwidth value compared with a total bandwidth of the multicarrier. The carrier aggregation may be generated by aggregation of one or more carriers, wherein the one or more carriers are aggregated in an exterior direction on the basis of an intermediate frequency (IF) of the carrier aggregation. The carrier aggregation may be configured using at least one of a physical resource unit (PRU), a guard resource unit (GRU), and an irregular PRU.

In another aspect of the present invention, a method for transmitting/receiving carrier aggregation information includes receiving a first message including multicarrier capability (MC) information of a mobile station (MS) from the mobile station (MS), allocating a radio resource to the mobile station (MS) on the basis of the multicarrier capability (MC) information, and transmitting a second message including allocation information of the radio resource to the mobile station (MS), wherein the multicarrier capability (MC) information includes a spectral mask shape parameter of multiple carriers capable of being supported by the mobile station (MS).

The method may further include transmitting a multicarrier configuration index (MCI) related to a carrier aggregation supported by the base station (BS) to the mobile station (MS). The multicarrier configuration index (MCI) may include information about a total bandwidth of the carrier aggregation supported by the base station (BS), information about the number of sub-bands contained in the carrier aggregation, and configuration order information of the sub-bands.

The carrier aggregation may be generated by aggregation of one or more carriers, wherein the one or more carriers are aggregated in an exterior direction on the basis of an intermediate frequency (IF) of the carrier aggregation. The spectral mask shape parameter may be decided as an effective bandwidth value compared with a total bandwidth of the multicarrier.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
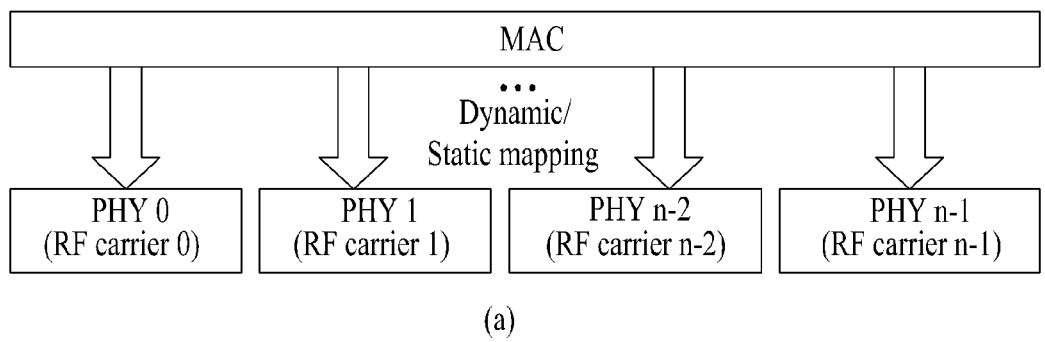
FIGS. 1(a) and 1(b) illustrate methods for transmitting and receiving signals based on a multi-band radio frequency (RF) scheme.
Figure 1:
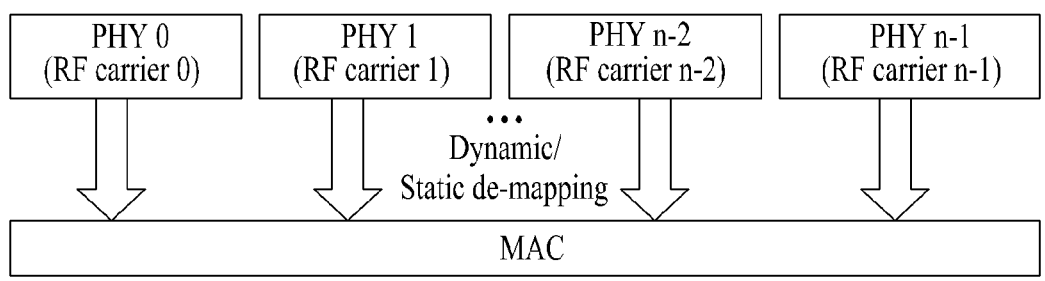
Figure 2:
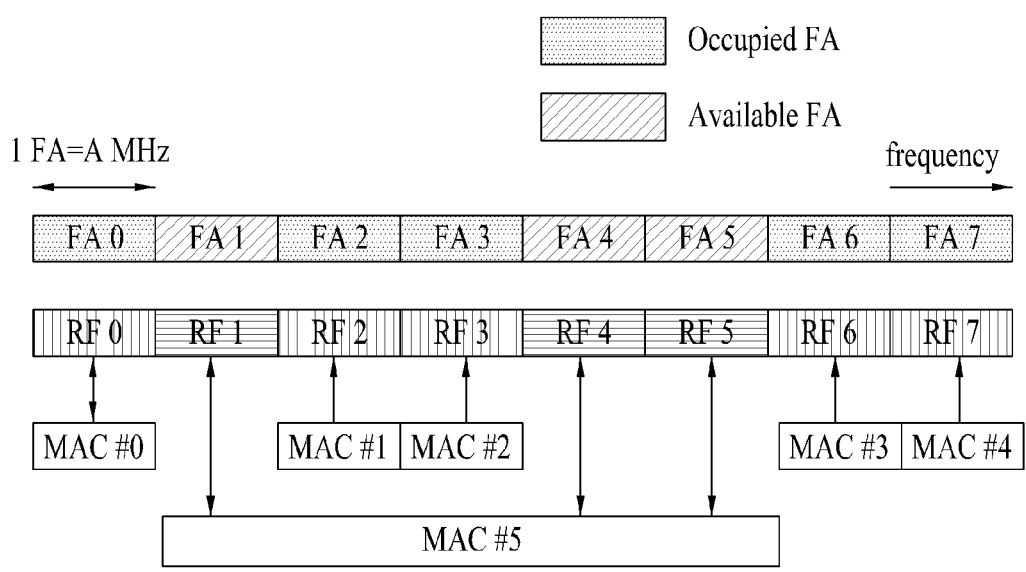
FIG. 2 exemplarily shows a method for allocating a frequency in a carrier aggregation system.
Figure 3:
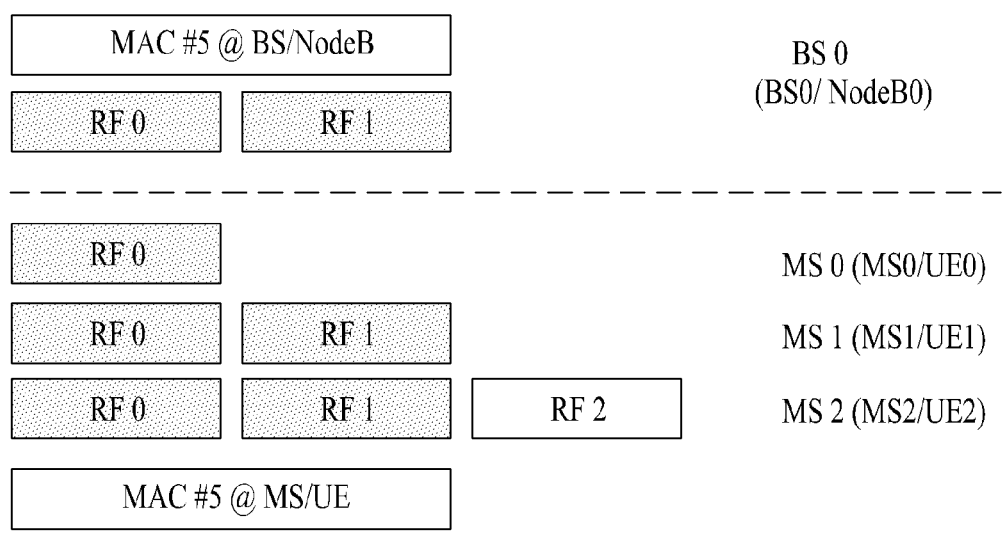
FIG. 3 exemplarily shows a scenario of communication between one base station (BS) and several mobile stations (MSs) in multi-band scheme.

Reference will now be made in detail to the preferred embodiments of the present invention, examples of which are illustrated in the accompanying drawings. Wherever possible, the same reference numbers will be used throughout the drawings to refer to the same or like parts. Exemplary embodiments of the present invention provide a wireless access system. The embodiments of the present invention describe various methods and apparatuses for aggregating multiple carriers in a wireless access system, and various methods and apparatuses for providing information of a carrier structure formed by aggregation of multiple carriers.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description, drawings, procedures or steps, which may obscure the substance of the present invention, are not explained. Additionally, procedures or steps, which can be understood by those skilled in the art, are not explained.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS)', etc. The term 'MS' may be replaced with the term 'User Equipment (UE)', 'Subscriber Station (SS)', 'Mobile Subscriber Station (MSS)', 'mobile terminal (MT)', 'Advanced Mobile Station (AMS)', etc.

A transmitter is a mobile node and/or a fixed node that transmits voice or data service and a receiver is a mobile node and/or a fixed node that receives voice or data service. Hence, an MS may be a transmitter and a BS may be a receiver in uplink. Likewise, the MS may be a receiver and the BS may be a transmitter in downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smartphone, a Multi-Mode Multi-Band (MM-MB) terminal, etc.

Smartphones are terminals having the advantages of both mobile phones and PDAs. Smartphones incorporate the functions of a PDA, that is, scheduling and data communication such as fax transmission and reception and Internet connection, into a mobile phone. The MM-MB terminal refers to a terminal which has a multi-modem chip built therein and which can operate in any of a mobile Internet system and other mobile communication systems (e.g. CDMA 2000, WCDMA, etc.)

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, steps or parts, description of which is omitted herein so as not to obscure the technical idea of the present invention, may be supported by the above documents. All terminology used herein may be supported by at least one of P802.16-2004, P802.16e-2005, and P802.16Rev2 documents which are the standards of IEEE 802.16.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Specific terms used for the exemplary embodiments of the present invention are provided to aid in understanding of the present invention. These specific terms may be replaced with other terms within the scope and spirit of the present invention.

Figure 4:
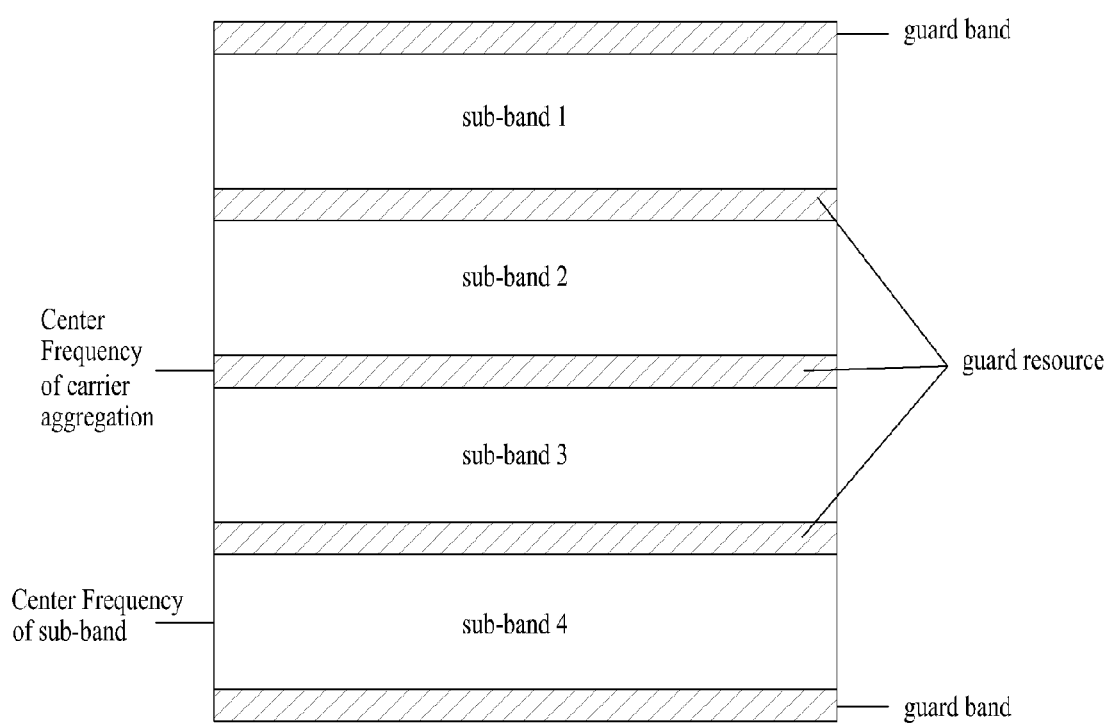
FIG. 4 is a basic structure of a carrier aggregation.

FIG. 4 is a basic structure of a carrier aggregation.

Referring to FIG. 4, a carrier aggregation may include guard bands, guard resources, and sub-bands (Sub-band 1 to Sub-band 4). Carrier aggregation may use a single RF transmitter and one single BB processing (i.e., a single large FFT) so as to transmit data over multiple contiguous sub-bands. A bandwidth of more than 20 MHz may be supported through carrier aggregation.

In accordance with the embodiments of the present invention, the sub-band is an independent RF band for constructing a larger bandwidth via which an IEEE 802.16m signal is transmitted. Although individual sub-bands are aggregated into a larger bandwidth, each sub-band maintains its own original structure serving as a single carrier so as to support a mobile station (MS). In addition, the guard resource is comprised of additional subcarriers that can be transmitted after completion of carrier aggregation. The size of such guard resource may depend upon two contiguous sub-bands.

In FIG. 4, subcarriers of guard bands located at the edge of the combined bandwidth are not used for transmission. The guard band is a subcarrier interval for preventing interference with other large band. In addition, a center frequency of the combined large bandwidth is indicative of an intermediate value of a total of combined bandwidths. The center frequency may be located in a guard resource or a sub-band.

Assuming that the center frequency of the large bandwidth is located at the center of a specific sub-band, the center frequency of the large bandwidth may be considered to be identical to the center frequency of the specific sub-band. In order to reduce a Direct Current (DC) offset value, the center frequency may be punctured as necessary. In addition, the center frequency of the sub-band may be located at the center of a frequency band of each sub-band.

Bandwidth Requirement for Constructing Carrier Aggregation

In accordance with ITU-R requirements for an IMT-Advance System, it is preferable that a minimum supported bandwidth be set to 40 MHz and be extended up to 100 MHz. In addition, the IEEE 802.16m system, one type of IMT-Advance system, needs to support an extendable bandwidth of 5 MHz to 40 MHz. Such extendable bandwidth can be supported by a single RF carrier or multiple RF carriers.

Presently, the IEEE 802.16m system has defined operations covering a maximum bandwidth of 20 MHz, and is attempting to overcome such limitations to carrier aggregation. Although the IEEE 802.16m system uses multiple RF carriers, it is preferable that the carrier aggregation structure satisfy the following requirements (1) to (3).

(1) Peak Data Rate: 100 Mbit/s at maximum velocity, and 1 Gbit/s when stationary.

(2) Bandwidth: Bandwidth must be supported by a single RF carrier or multiple RF carriers, and such bandwidth must be extended from 40 MHz to 100 MHz.

(3) Maximum Spectral Efficiency:

Downlink (DL): 15 bits/s/Hz

Uplink (UL): 6.75 bits/s/Hz

A minimum requirement for a maximum aggregation bandwidth ($F_{ABW}$) may be derived from the above-mentioned requirements (1), (2) and (3) ($F_{ABW}$≥1 Gbps/15 bps/Hz=66.66 MHz). Therefore, it is preferable that a bandwidth greater than 67 MHz (for example, 70, 80, 90, or 100 MHz) be considered. Of course, the above-mentioned requirements may be changed according to user requirements or RF channel environments.

A. Bandwidth of Sub-Band

A bandwidth for use in carrier aggregation may be selected from among 5 MHz, 10 MHz and 20 MHz.

In order to perform carrier aggregation in consideration of numerous variables according to the embodiments of the present invention, utilization of a 5 MHz bandwidth will be omitted herein for convenience of description and better understanding of the present invention.

B. Total Bandwidth of Carrier Aggregation

A total bandwidth of carrier aggregation is closely related to a Fast Fourier Transform (FFT) size. It is preferable that FFT be utilized in view of complexity. Therefore, 10 MHz, 20 MHz, 40 MHz, and 80 MHz bandwidths must be considered. A bandwidth ranging from 66.66 MHz (minimum bandwidth) to 80 MHz can sufficiently support a peak data transfer rate of 1 Gbps.

If it is assumed that a mobile station (MS) supports a maximum 8192 FFT, although this method for enabling the MS to support the maximum 8192 FFT unavoidably encounters a Signal to Noise Ratio (SNR) loss in dummy operation and large local area network (LAN) bandwidth, additional bands are removed after the MS has received an 80 MHz signal, such that the MS can receive all other bands.

From the viewpoint of complexity of the end part, a great deal of research for deciding whether to support a bandwidth (e.g., 90 MHz, 100 MHz, etc.) larger than an 80 MHz bandwidth as an aggregated bandwidth is needed. In addition, 16384 FFT must be carried out, such that requested complexity may be excessively increased.

As another access example for utilizing a multiple RF transceiver, a 50 MHz bandwidth may be an aggregate of a 10 MHz bandwidth and a 40 MHz bandwidth, a 60 MHz bandwidth may be an aggregate of a 20 MHz bandwidth and a 40 MHz bandwidth, and a 100 MHz bandwidth may be any one of an aggregate of a 80 MHz bandwidth and a 20 MHz bandwidth and an aggregate of a 60 MHz bandwidth and a 40 MHz bandwidth. In this case, a guard band of each aggregate band is not used so as to minimize the above-mentioned loss.

C. Spectral Format in Consideration of Transmission Spectral Mask

Figure 5:
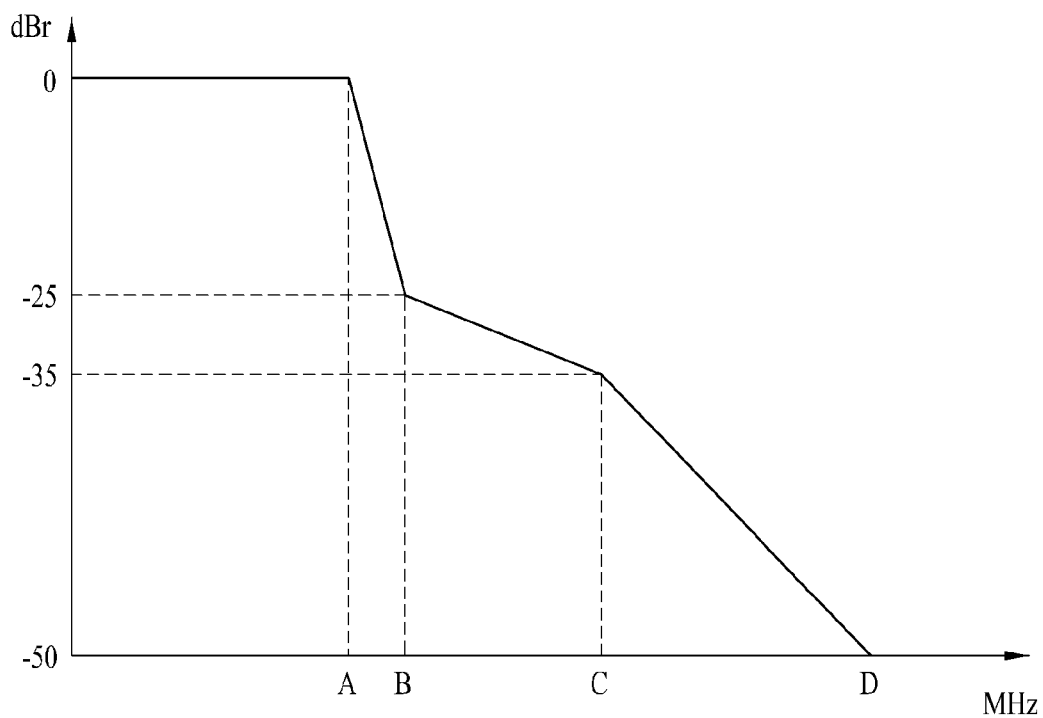
FIGS. 5 and 6 exemplarily show a transmission spectral mask structure and a spectral mask according to embodiments of the present invention.
Figure 6:
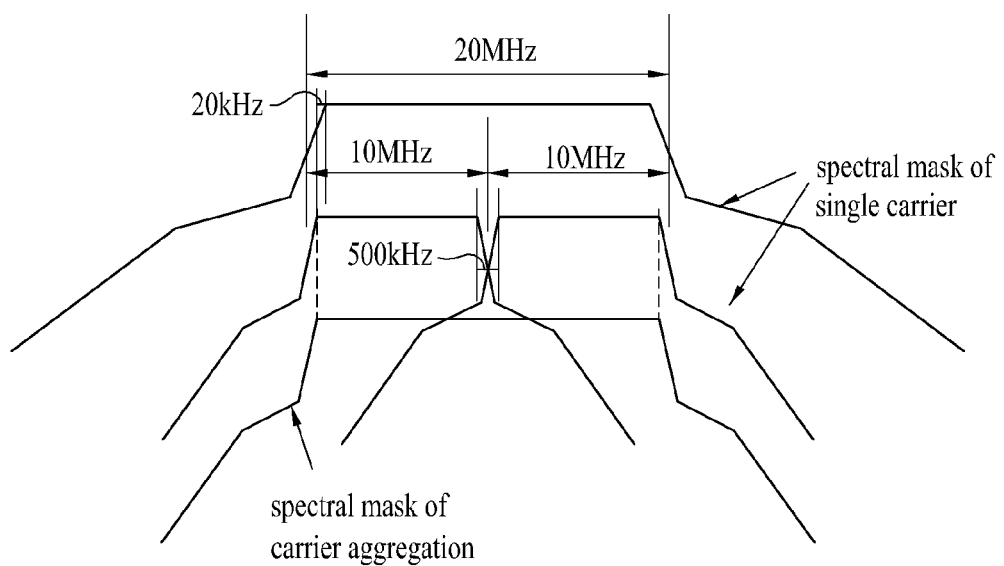

FIGS. 5 and 6 exemplarily show a transmission spectral mask structure and a spectral mask according to embodiments of the present invention.

In the IEEE 802.16m system, a transceiver performs oversampling to reduce image interference and then transmits data. For example, after transmission of a 10 MHz signal is achieved when 1024 IFFT is performed through a 11.2 MHz bandwidth (BW), only 914 subcarriers corresponding to the 10 MHz bandwidth are transmitted. In reality, only 864 subcarriers from among 914 subcarriers are adapted for data transmission. Generally, no problem occurs in downlink (DL), but unexpected problems may occur in uplink (UL).

The following Table 1 shows an example of a spectral mask parameter format.

TABLE 1

|  | A | B | C | D |
|---|---|---|---|---|
| 10 MHz | 4.75 | 5.45 | 9.75 | 14.75 |
| 20 MHz | 9.5 | 10.9 | 19.5 | 29.5 |
| aggregated 20 MHz | 9.75 | 10.45 | 14.75 | 19.75 |

Table 1 shows parameters of a spectral mask for use in a single frequency band of 10 Hz or 20 MHz and parameters of a spectral mask for use in a carrier aggregation of a 20 MHz bandwidth. In Table 1, A, B, C and D respectively correspond to individual frequency bands shown in FIG. 5. FIG. 6 shows a spectral mask spectrum obtained when spectral mask parameters shown in Table 1 are substituted into the spectral mask structure shown in FIG. 5.

Assuming that a spectral mask defined in the first two rows of Table 1 is used in a single carrier system, it is preferable that different parameter values be defined in an aggregated 20 MHz bandwidth capable of solving the above-mentioned problem, and such parameters may be defined as mobile station (MS) capability.

In case of a downlink (DL) control channel, when a 20 MHz spectral mask aggregated with a corresponding MS is supported according to MS capability, it is preferable that the base station (BS) schedules to use a resource unit (RU) located in an edge band. If the MHz spectral mask aggregated with the MS capability is not supported, the BS need not assign the RU to some regions incapable of being transmitted through the MS. The above limitation may also be equally applied to a UL control channel of the MS.

If the MS transmits spectral mask parameters of Table 1 to the BS so as to indicate MS capability, individual transmission of each spectral mask parameter to all bandwidths is far from efficient. In addition, a spectral mask value is generally related to the number of taps of transmission (Tx) filters.

As a more efficient method, the MS may transmit a spectral mask shape parameter corresponding to an effective bandwidth (e.g., 2A) compared with the entire bandwidth (e.g., 10 MHz bandwidth), instead of transmitting a spectral mask parameter indicating individual capabilities to the BS.

The following Equation 1 shows a method for calculating a spectral mask shape parameter.

$$\text{Spectral Mask Shape Parameter} = \frac{2A}{BW} \quad [\text{Equation 1}]$$

For example, referring to Equation 1, in the case of a conventional single carrier (e.g., 10 MHz or 20 MHz), spectral mask shape parameter values are 2*4.75/10=0.95 (10 MHz) and 2*9.5/20=0.95 (20 MHz), respectively. In case of the aggregated 20 MHz bandwidth, a spectral mask shape parameter value may be 2*9.75/20=0.975. In case of using a 40 MHz bandwidth composed of four 10 MHz bandwidths, the requirement denoted by "2*19.5/40=0.975" may be given. Generally, it is assumed that only some effective bandwidth values are generally fixed, such that such effective bandwidth values may be represented by a small number of bits.

The following Table 2 shows a spectral mask shape parameter using spectral mask performance.

TABLE 2

| Syntax | Bits | Description |
|---|---|---|
| Tx Spectral Mask Shape | 3 | Ratio between effective BW and overall BW<br>0b000: 0.95<br>0b001: 0.975<br>0b010: 0.9875<br>0b011: 0.99375<br>0b100: 0.996875<br>0b1xx: reserved |

Table 2 shows spectral mask shape parameters capable of being supported by the MS, and may be represented by an index having a size of 3 bits. The MS may inform the BS of MS capability in a capability negotiation process or an initial registration process. In this case, the MS may inform the BS of the spectral mask capability serving as a spectral mask shape parameter FIG. 7 is a flowchart illustrating a method for informing a base station (BS) of a spectral mask performance capable of being supported by a mobile station (MS) according to one embodiment of the present invention.

Figure 7:
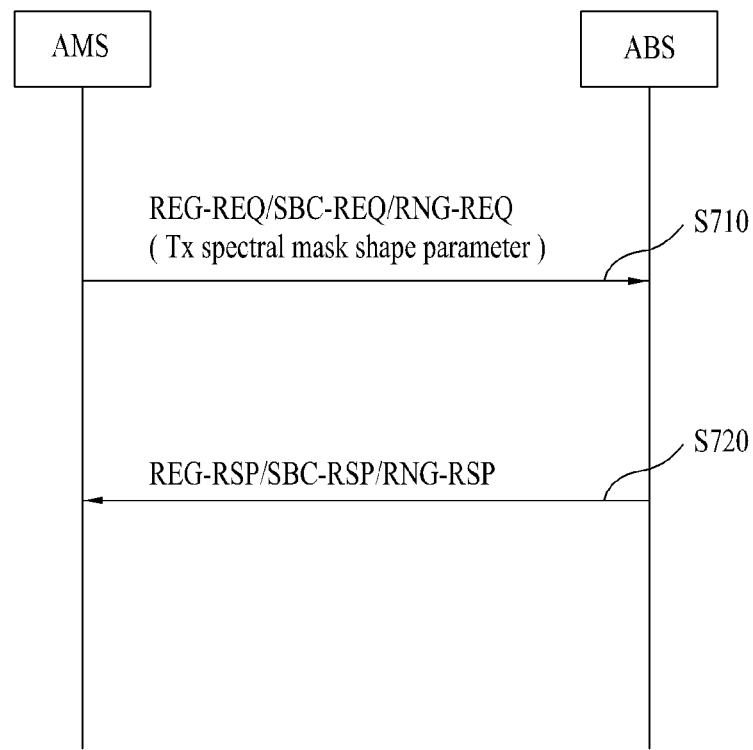
FIG. 7 is a flowchart illustrating a method for informing a base station (BS) of spectral mask performance capable of being supported by a mobile station (MS) according to one embodiment of the present invention.

Referring to FIG. 7, an Advanced Mobile Station (AMS) includes a spectral mask shape parameter of Table 2 in any one of a registration request (REG-REQ) message for use in an initial registration process, a subscriber station basic capability request (SBC-REQ) message for use in a capability negotiation process, a ranging request (RNG-REQ) message for updating an AMS location in an idle mode, and a multi-carrier capability request (MC-REQ) message activated after network entry, such that it can transmit the resultant message including the spectral mask shape parameter to the ABS at step S710.

At step S710, the spectral mask shape parameter may be contained in capability information of the AMS (i.e. AMS capability information), such that the resultant AMS capability information may be transmitted to the ABS.

The ABS receives the spectral mask shape parameter of the AMS, such that it can confirm carrier information (indicating whether a legacy carrier or carrier aggregation is supported) supported by the AMS on the basis of the received spectral mask shape parameter. That is, the AMS can confirm an effective bandwidth and an overall bandwidth supported by the AMS. Therefore, under individual procedures, the ABS may transmit a registration response (REG-RSP) message, a subscriber station basic capability response (SBC-RSP) message, a ranging response (RNG-RSP) message and a multi-carrier capability response (MC-RSP) message, that correspond to the spectral mask shape parameter and include system information (e.g., carrier structure, etc.) supported by the ABS, to the AMS at step S720.

In the case where the multicarrier (carrier aggregation) capability negotiation procedure between the AMS and the ABS is separately defined as shown in FIG. 7, the AMS may transmit the multicarrier capability (MC) parameter to the ABS during the corresponding step. Exemplary messages shown in FIG. 7 are disclosed for illustrative purposes only, and other messages performing the same function and operation may be utilized.

Method for Constructing Carrier Aggregation

A method for constructing a resource unit (RU) about a carrier aggregation will hereinafter be described in detail.

The carrier aggregation corresponding to aggregation of several carriers may be utilized by an AMS supporting multiple carriers and an AMS supporting a single carrier. In addition, an AMS, that currently uses only a single carrier, although capable of receiving multiple carriers, can use carrier aggregation. Therefore, it is preferable that a Physical Resource Unit (PRU) defined in the carrier aggregation be defined to be identical to a PRU used in a single carrier system.

In the case of using the aggregated carrier (i.e., carrier aggregation), a specific part that has been used as a guard subcarrier may be adapted to transmit data. That is, a guard resource shown in FIG. 4 serves as a guard carrier. It is more efficient that a subcarrier structure corresponding to the guard resource equally utilize a conventional PRU structure. In fact, a guard resource region occupies a relatively small part of an overall bandwidth, such that the use of a new structure is far from efficient. In this case, a new PRU constructed by application of a conventional PRU structure may be defined as a guard resource unit (GRU).

Generally, a PRU may be classified into a Distributed RU (DRU) for use in a diversity mode, a contiguous RU (CRU) for use in a band Adaptive Modulation and Coding (band AMC) mode, and a Localized Logical Resource Unit (LLRU).

In order to enable the ABS to construct a DRU, subcarriers contained in several PRUs distributed to an overall bandwidth may be reconstructed and used. In this case, it is difficult for a GRU to be used by all AMSs, such that it is more efficient to use a CRU.

In addition, the remaining subcarriers obtained when an independent PRU is constructed in an aggregated carrier bandwidth may be used according to the following three options 1 to 3.

Option 1: The remaining subcarriers may be used as new irregular PRUs. That is, the AMS and the ABS construct the remaining carriers as irregular PRUs, such that data can be communicated between the AMS and the ABS.

Option 2: The remaining subcarriers remain empty, such that they are set to null carriers.

Option 3: The remaining subcarriers may be adapted to transmit a control channel defined only for the AMS capable of receiving a signal of a corresponding region.

Generally, the remaining region includes a null carrier for DC because the remaining regions are often located in the center frequency of an aggregated bandwidth (BW). In this case, continuity of data allocation may be unavoidably broken, such that it is preferable that the remaining region remain empty.

Figure 8:
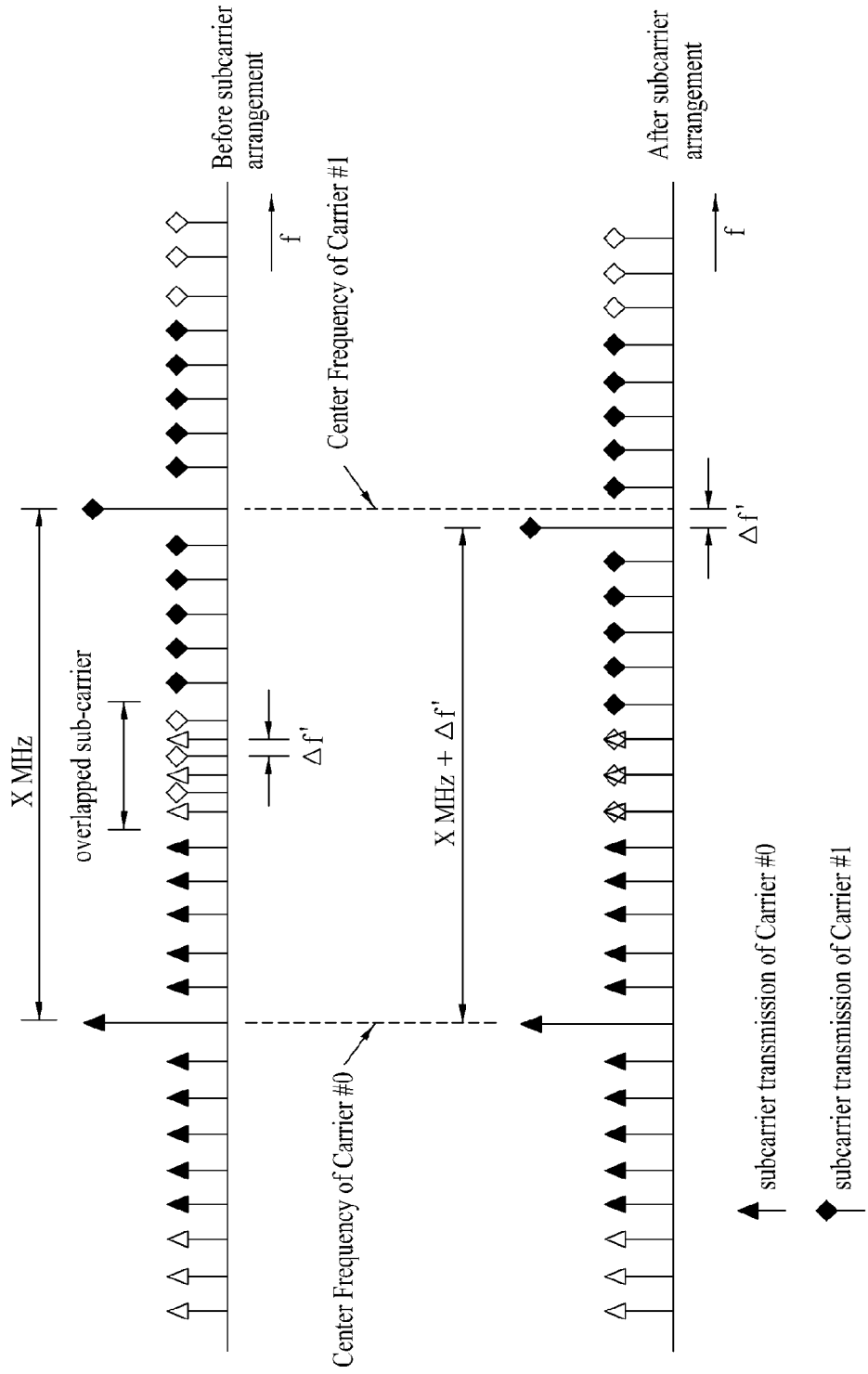
FIG. 8 is a conceptual diagram illustrating a method for arranging subcarriers of contiguous carriers for carrier aggregation according to one embodiment of the present invention.

FIG. 8 is a conceptual diagram illustrating a method for aligning subcarriers of contiguous carriers for carrier aggregation according to one embodiment of the present invention.

If contiguous carriers are successively allocated, subcarriers contained in contiguous OFDMA carriers for use in the IEEE 802.16m or 3GPP LTE system may be used as an interference signal in a carrier edge.

If relative positions of these subcarriers are allocated at a multiple of subcarrier spacing, the ABS can perform the same IFFT on signals being transmitted through subcarriers, such that it can transmit the resultant signals. In this case, interference between carriers is not encountered.

In addition, since no interference exists, an AMS, that is capable of receiving a signal of the entire aggregated bandwidth, may use subcarriers present in the guard band to transmit data. To accomplish this, the center frequency of a specific carrier may be shifted on a frequency axis.

Referring to FIG. 8, subcarriers of a carrier (Carrier #0) are denoted by arrows while subcarriers of a carrier (Carrier #1) are denoted by diamonds. In this case, when aggregating Carrier #0 and Carrier #1, subcarriers overlapped between both carriers may be generated. In FIG. 8, an upper drawing shows the appearance before alignment of subcarriers, and a lower drawing shows the appearance after alignment of subcarriers. In this case, subcarriers of Carrier #0 are shifted to Carrier #1 by a variation amount ($\Delta f$), such that interference between both carriers can be reduced.

Figure 9:
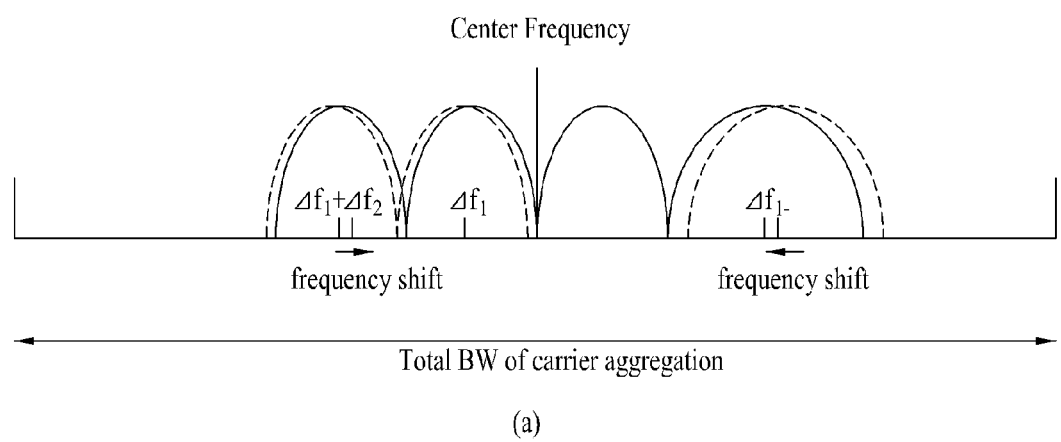
FIG. 9 is a conceptual diagram illustrating a method for constructing a carrier aggregation according to another embodiment of the present invention.
Figure 9:
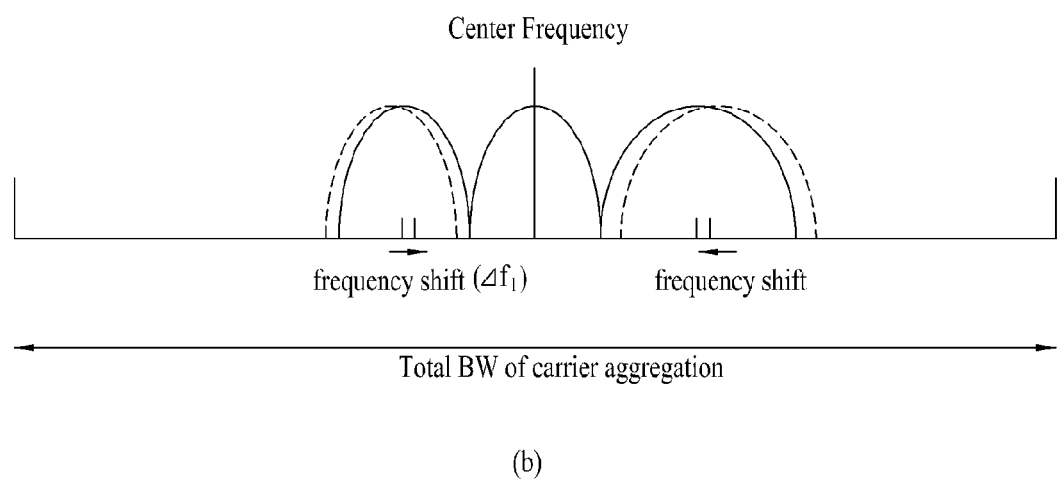

FIG. 9 is a conceptual diagram illustrating a method for constructing a carrier aggregation according to another embodiment of the present invention.

A method for constructing a carrier aggregation applicable to embodiments of the present invention will hereinafter be described with reference to the following operations (1), (2), (3) and (4). In operation (1), DC subcarrier of the entire aggregated bandwidth is always located at the center of the overall bandwidth. In operation (2), one or more sub-bands are gradually aggregated toward the outside on the basis of a center frequency. In operation (3), it is preferable that the center frequency of each sub-band be frequency-shifted in such a manner that the same subcarrier spacing is provided toward the center frequency direction of the entire bandwidth. In operation (4), it is preferable that a frequency shift value be less than OFDMA subcarrier spacing. For example, the frequency shift value may be less than half the subcarrier spacing.

FIG. 9($a$) shows an exemplary case in which the center frequency of the entire bandwidth is located between sub-bands. FIG. 9($b$) shows an exemplary case in which the center frequency of a sub-band located in the center part is located at the same position as the center frequency of the entire bandwidth. FIGS. 9($a$) and 9($b$) show carrier aggregations according to the above-mentioned carrier aggregation construction method.

A carrier aggregation structure generated by the above-mentioned method for constructing a carrier aggregation structure will hereinafter be described with reference to the attached drawings.

Figure 10:
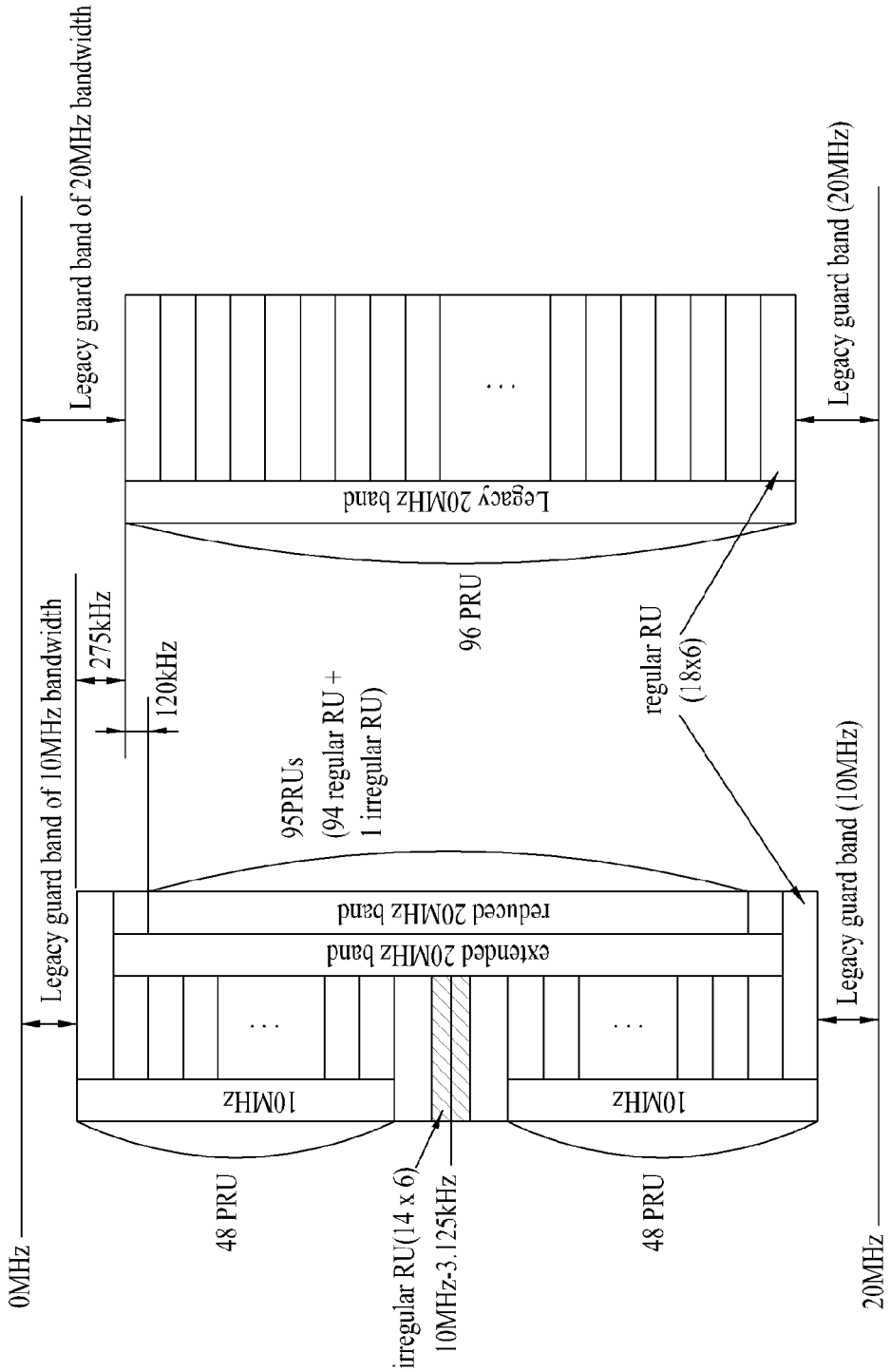
FIG. 10 shows one of carrier aggregation structures according to another embodiment of the present invention.

FIG. 10 shows one carrier aggregation structure according to another embodiment of the present invention.

Referring to FIG. 10, a bandwidth located at the right part of FIG. 10 indicates a legacy 20 MHz bandwidth. In this case, the legacy 20 MHz bandwidth may be comprised of 96 PRUs. One PRU may construct a regular RU having one regular size. One regular RU may be comprised of 18 subcarriers and 6 OFDM symbols. In addition, the legacy 20 MHz bandwidth may include a legacy guard band for the 20 MHz bandwidth.

A bandwidth located at the left part of FIG. 10 indicates a carrier aggregation generated by aggregation of the legacy 10 MHz bandwidth. In this case, the carrier aggregation may include two 10 MHz bands each having 48 PRUs, two regular RUs, and one irregular RU. A total of 98 PRUs and one irregular RU are used in a carrier aggregation structure. The number of PRUs contained in the left bandwidth of FIG. 10 is higher than 96 PRUs of the legacy 20 MHz bandwidth by at least two PRUs.

Assuming that a mobile station (MS) can transmit and receive a signal in a legacy 20 MHz bandwidth, the MS operation can be classified into a first case in which all 98 PRUs are transmitted/received according to the transmission/reception characteristics, a second case in which 96 PRUs are transmitted/received, and a third case in which only 94 PRUs are transmitted/received. In conclusion, a band composed of a carrier aggregation for use in a specific MS may be comprised of an extended 20 MHz band and a reduced 20 MHz band.

In this case, the reduced 20 MHz band may include 95 PRUs (e.g., 94 regular RUs and one irregular RU), and the extended 20 MHz band may include 97 PRUs (e.g., 96 regular RUs and one irregular RU) or 99 PRUs (e.g., 98 regular RUs and one irregular RU). In this case, each of both sides of the reduced 20 MHz band may be smaller than the legacy 20 MHz band by a predetermined size corresponding to 120 KHz. In addition, each of both sides of a carrier aggregation formed by aggregation of the 10 MHz band may be larger than the legacy 20 MHz band by a predetermined size corresponding to 275 kHz.

Figure 11:
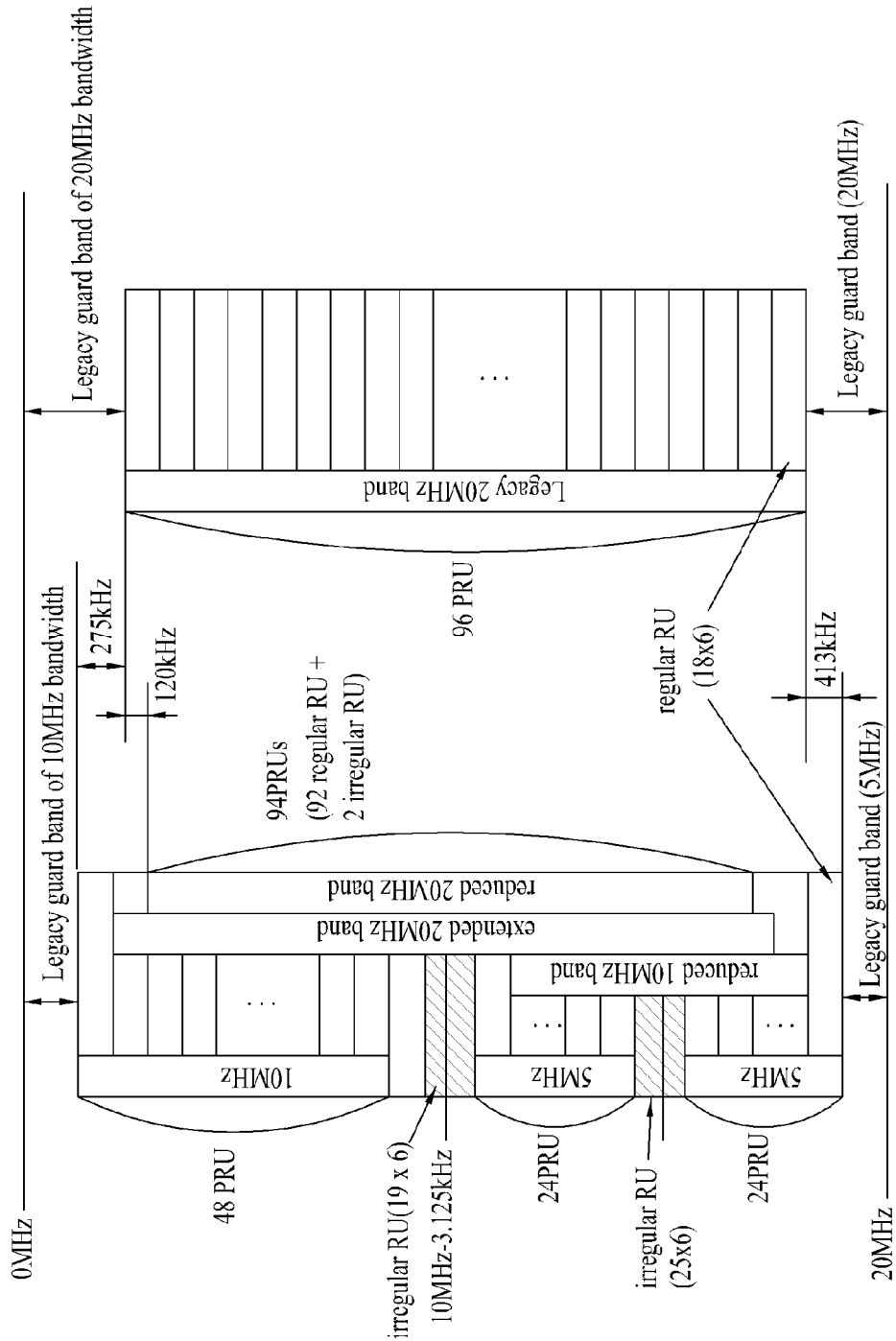
FIG. 11 shows another carrier aggregation structures according to another embodiment of the present invention.

FIG. 11 shows a carrier aggregation structure according to another embodiment of the present invention.

The legacy 20 MHz band is shown in the left part of FIG. 11, and a detailed description thereof is identical to those of FIG. 10. However, the carrier aggregation shown in the right part of the FIG. 11 is different from that of FIG. 10. Referring to FIG. 11, the carrier aggregation may be identical to an aggregation of two 5 MHz bands and one 10 MHz band. In this case, an irregular RU may be located between the aggregated 5 MHz bands, and may also be located between the 5 MHz band and the 10 MHz band. In this case, the 10 MHz band may include 48 PRUs, and the 5 MHz band may include 24 PRUs. In addition, the irregular RU located between the 5 MHz bands may include 25 subcarriers and 6 OFDMA symbols, and the irregular RU located between the 10 MHz band and the 5 MHz band may include 19 subcarriers and 6 OFDMA symbols. Therefore, according to the carrier aggregation structure, the overall bandwidth may include 99 PRUs.

In addition, the carrier aggregation may be comprised of the extended 20 MHz band or the reduced 20 MHz band. In this case, the reduced 20 MHz band may include 94 PRUs (e.g., 92 regular RUs and 2 irregular RUs). In addition, the carrier aggregation may be comprised of the reduced 10 MHz band and a predetermined number of PRUs. Values of elements constructing other carrier aggregation not mentioned in the present invention may refer to FIGS. 10 and 11.

Methods for transmitting/receiving carrier aggregation configuration information according to another embodiment of the present invention will hereinafter be described in detail.

A carrier aggregation structure (i.e., a multicarrier structure) may be configured through various configuration parameters. In order to enable the ABS to represent all available carrier aggregation structures, a huge amount of configuration information must be transmitted to the MS.

The following Table 3 shows exemplary important parameters from among carrier aggregation configuration information that is transmitted from the ABS to the AMS.

TABLE 3

| Name | Size | Notes |
| --- | --- | --- |
| PRU Structure | | Positions of Regular and/or irregular PRU, position of null region, DC subcarrier, etc . . . |
| center frequency of each sub-band | | Frequency Shift Value (Δf) |
| Parameters related to spectral mask | | |
| Carrier Construction Method | | Number of carriers, types and allocation order of carriers |

If it is assumed that the ABS transmits carrier aggregation configuration information shown in Table 3 to the ABS without change, the ABS operation may be far from efficient.

Therefore, the ABS configures a predetermined carrier in the form of an index, and transmits only the index to the AMS, such that it can effectively transmit carrier configuration information. The above-mentioned index may be defined as a multicarrier configuration index (MCI).

The following Table 4 shows an exemplary MCI.

TABLE 4

| MCI | Total BW | BW Configuration | CI | Irregular PRU | Center Frequency | Effective bandwidth |
| --- | --- | --- | --- | --- | --- | --- |
| 0 | 10 MHz | 2*5 MHz | 0 | 7*6(or 25*6) | TBD | TBD |
| 1 | 15 MHz | 3*5 MHz | 0 | 7*6(or 25*6) | TBD | TBD |
| ... | ... | ... | ... | ... | ... | ... |
| 3 | 15 MHz | 10 MHz + 5 MHz | 2 | 19*6(one for DC) | TBD | TBD |
| 4 | 20 MHz | 2*10 MHz | 0 | 14*6(one for DC) | TBD | TBD |
| ... | ... | ... | ... | ... | ... | ... |
| ... | 20 MHz | 2*5 MHz + 10 MHz | 4 | — | TBD | TBD |
| ... | ... | ... | ... | ... | ... | ... |
| N | 40 MHz | 20 MHz + 20 MHz | N | — | TBD | TBD |
| ... | ... | ... | ... | ... | ... | ... |

When additional limitations are placed upon carrier aggregation according to the embodiments of the present invention, MCI can be further simplified. Important information from among information contained in the MCI may include total bandwidth, center frequency, individual sub-band configuration information, etc.

The following Table 5 shows an example of another MCI reconstructed by the above important information.

TABLE 5

| MCI | Total BW | Numbers of Sub-bands | Sub-band construction order (bit0: 10 MHz, bit1: 20 MHz) | ... |
| --- | --- | --- | --- | --- |
| 0 | 20 MHz | 2 | 00 | |
| 1 | 40 MHz | 4 | 0000 | |
| 2 | 40 MHz | 3 | 010 | |
| 3 | 40 MHz | 2 | 11 | |
| ... | ... | ... | ... | ... |
| N | 80 MHz | 4 | 1111 | |
| — | ~100 MHz | ... | ... | |

Referring to Table 5, MCI may be comprised of information about the size of a total bandwidth, information about the number of sub-bands constructing a carrier aggregation, and information about the order of sub-bands. In this case, the sub-band order may be represented using a bitmap. Bit 0 indicates a subband of the 10 MHz band, Bit 1 indicates a subband of the 20 MHz band.

Assuming that the sub-band having a 5 MHz or other-sized bandwidth is present, MCI may be represented by 2 bits. The ABS may transmit the MCI shown in Table 4 or 5 to the AMS through a primary carrier from among multiple carriers (multicarrier).

Figure 12:
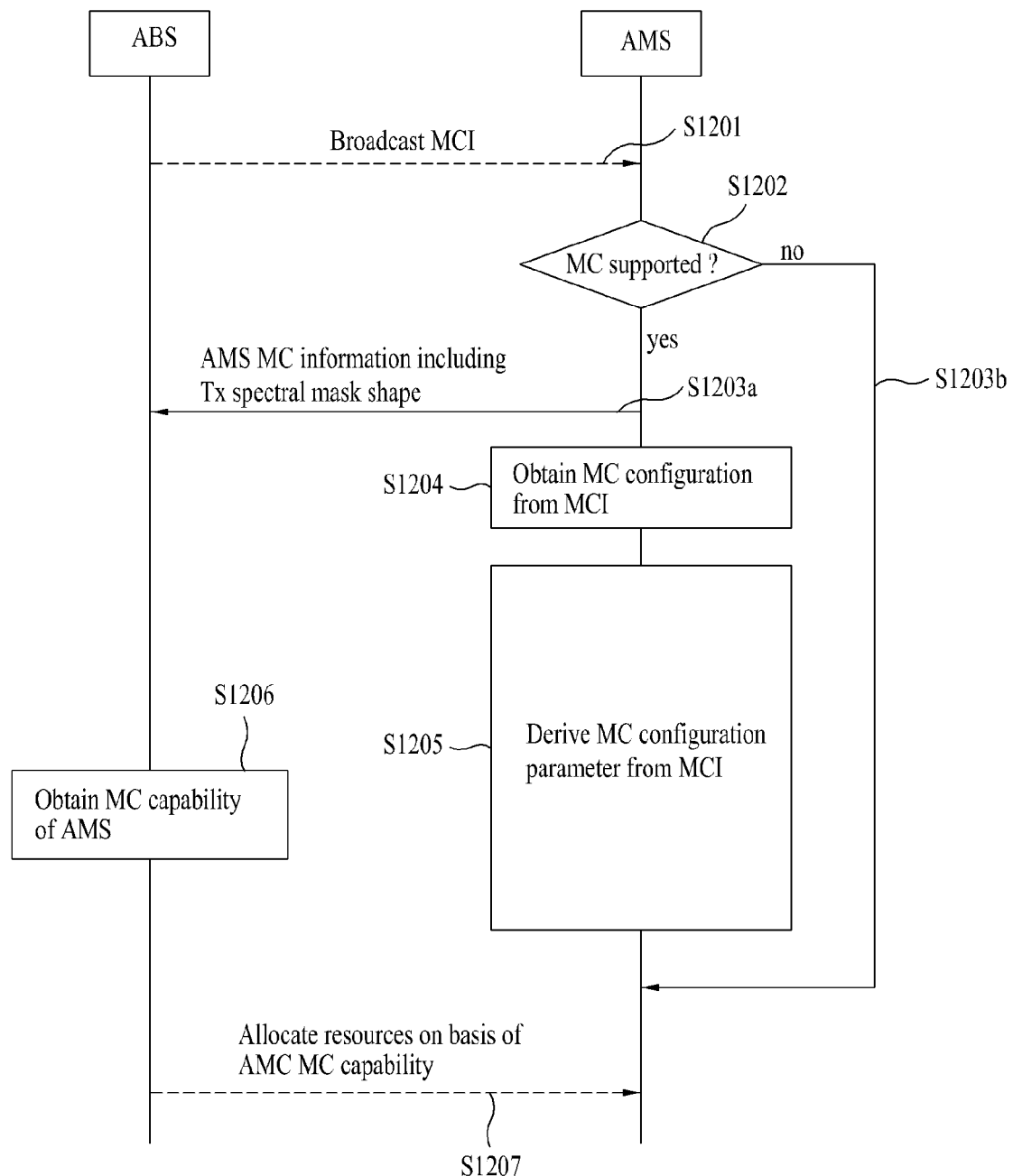
FIG. 12 is a flowchart illustrating one example of a method for transmitting/receiving multicarrier configuration index (MCI) information according to still another embodiment of the present invention.

FIG. 12 is a flowchart illustrating one example of a method for transmitting/receiving MCI information according to still another embodiment of the present invention.

Referring to FIG. 12, the ABS may periodically broadcast an MCI including configuration information of an ABS carrier aggregation to the AMS without receiving any request from the AMS at step S1201.

Upon receiving the MCI from the ABS, the AMS determines whether the AMS supports multicarrier (MC) transmission (i.e., a carrier aggregation) at step S1202. If the AMS supports MC transmission, the AMS can transmit multicarrier (MC) capability information including transmission spectral mask shape information of the AMS to the ABS at step S1203a.

The AMS acquires MC configuration information from the MCI at step S1204. The AMS may derive at least one of a bandwidth of a carrier aggregation, the number of carriers (or the number of sub-bands), and the center frequency (including frequency shift information (e.g. frequency offset) of each carrier), that are provided from the ABS at step S1205.

The ABS may acquire AMS MC capability from the AMS, and may allocate radio resources to the AMS on the basis of the AMS MC capability at step S1206.

The ABS may transmit information of radio resources allocated to the AMS at step S1207.

If the AMS does not support multicarrier (MC) at step S1202, the above-mentioned steps are not skipped, and the AMS may operate as a single carrier system at step S1203b.

Figure 13:
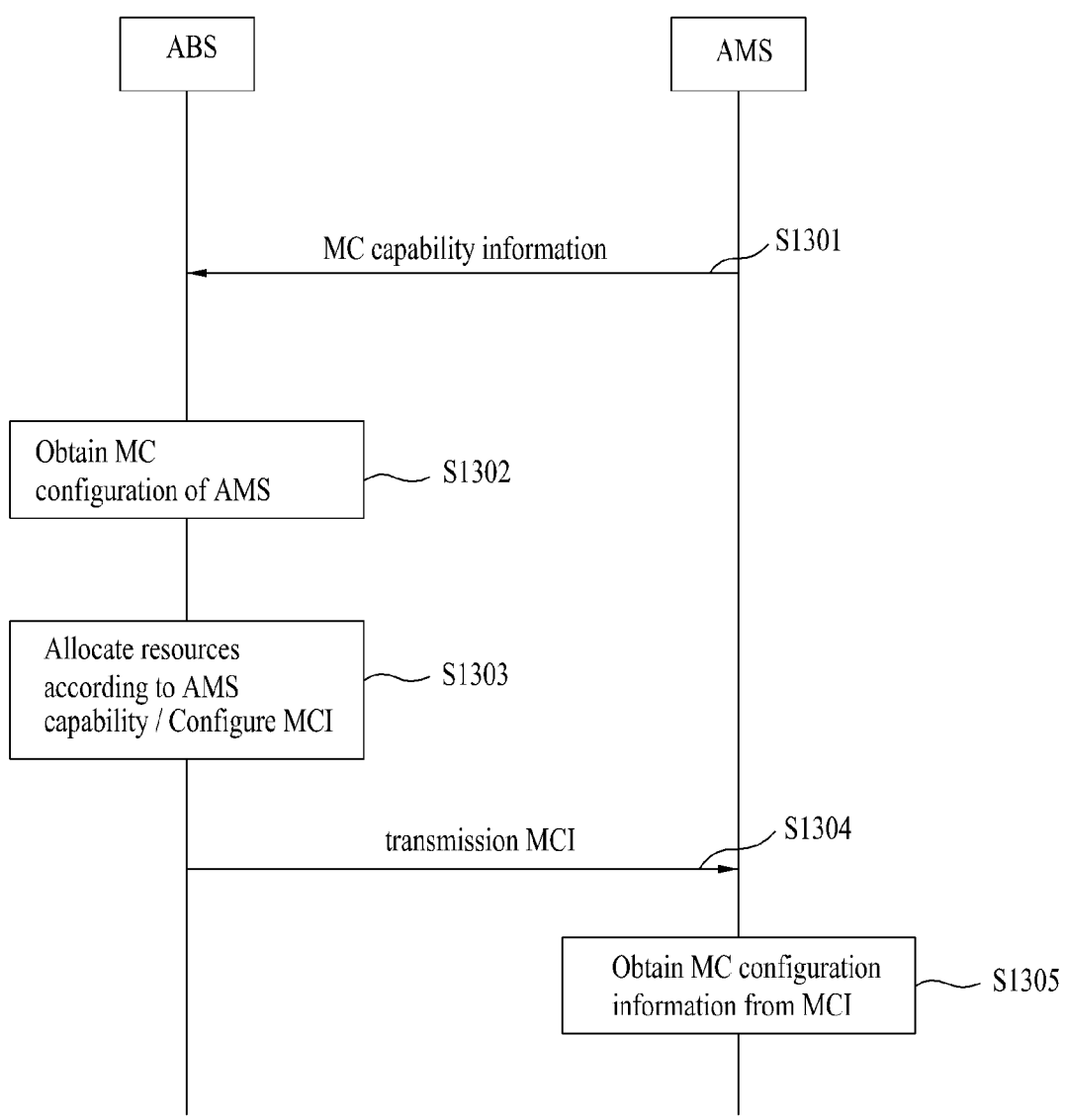
FIG. 13 is a flowchart illustrating another example of a method for transmitting/receiving multicarrier configuration index (MCI) information according to still another embodiment of the present invention.

FIG. 13 is a flowchart illustrating another example of a method for transmitting/receiving multicarrier configuration index (MCI) information according to still another embodiment of the present invention.

Referring to FIG. 13, the AMS may transmit multicarrier (MC) capability information including a transmission spectral mask shape parameter shown in Table 2 to the ABS at step S1301.

In step S1301, the transmission spectral mask shape parameter may be contained in each of a registration request (REG-REQ) message for use in an initial registration process, a subscriber station basic capability request (SBC-REQ) message for use in a capability negotiation process, and a ranging request (RNG-REQ) message for updating an AMS location in an idle mode, such that it can transmit the resultant message to the ABS.

The ABS may acquire multicarrier (MC) capability information of the AMS at step S1302. In addition, the ABS allocates radio resources to the AMS according to the AMS capability, and constructs an MCI indicating carrier aggregation (i.e., multicarrier) configuration information supported by the ABS at step S1303. The ABS may transmit the configured MCI to the AMS at step S1304.

In step S1304, the ABS may include MCI in any one of the REG-RSP message, the SBC-RSP message, and the RNG-RSP message, such that it can transmit the resultant message to the AMS. In this case, the REG-RSP, SBC-RSP or RNG-RSP message may include not only information of radio resources, that are allocated by the ABS to the AMS, but also system information (e.g., carrier aggregation information, etc.) supported by the ABS.

The AMS obtains MC configuration information from the received MCI, such that it may communicate with the ABS at step S1305.

Now a description will be given of an AMS and an ABS for implementing the above-described exemplary embodiments shown in FIGS. 5 to 13, according to another exemplary embodiment of the present invention.

The AMS may operate as a transmitter on an uplink and as a receiver on a downlink, while the ABS may operate as a receiver on the uplink and as a transmitter on the downlink. That is, each of the AMS and the ABS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for decrypting encrypted messages, an antenna for transmitting and receiving messages, etc.

The AMS according to the embodiments of the present invention may include a lower power Radio Frequency (RF)/Intermediate Frequency (IF) module. The AMS may perform a control function for implementing the above-described exemplary embodiments of the present invention, a variable MAC frame control function based on service characteristics and propagation environment, a handover function, an authentication and encryption function, a packet modulation/demodulation function for data transmission and reception, a high-speed packet channel coding function, a real-time MODEM control function, etc., by at least one of the above-described modules, or the AMS may further include an additional module, part or means for performing these functions.

The ABS may transmit data received from an upper layer to the AMS by wire or wirelessly. The ABS according to the embodiments of the present invention may include a lower power Radio Frequency (RF)/Intermediate Frequency (IF) module. In addition, the BS may perform a control function for implementing the above-described exemplary embodiments of the present invention, OFDMA packet scheduling, Time Division Duplex (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Specifically, the ABS may further include a module for generating a carrier aggregation structure (i.e., an aggregated carrier structure) and supporting the generated carrier aggregation as necessary. Of course, the processor contained in the ABS may perform the above functions. In addition, the above-mentioned AMS structure can enable a carrier aggregation system (e.g., a multicarrier system) to perform the above-mentioned operations related to the ABS using the above-mentioned constituent elements.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various wireless access systems including a $3^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields to which wireless access systems are applied.

As apparent from the above description, the exemplary embodiments of the present invention have the following effects.

First, the embodiments of the present invention can provide a method for aggregating/using a plurality of carriers.

Second, the embodiments of the present invention can effectively generate a carrier aggregation structure.

Third, the embodiments of the present invention provide a method and apparatus for transmitting/receiving information regarding a carrier aggregation structure, such that an RF channel can be effectively utilized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for negotiating multicarrier capability in a wireless access system supporting a carrier aggregation scheme, the method comprising:
   transmitting, by a mobile station (MS), a registration request (REG-REQ) message to a base station (BS) to negotiate the multicarrier capability and register to the BS during a network entry procedure, the REG-REQ message including information about multicarrier capabilities supportable by the MS;
   receiving, by the MS, a registration response (REG-RSP) message from the BS in response to the REG-REQ message, the REG-RSP message including information about multicarrier capabilities supportable by the BS; and
   receiving, by the MS, a message comprising a multicarrier configuration index (MCI) which represents a multicarrier configuration and a frequency shift value from the BS,
   wherein the multicarrier configuration indicates bandwidth information for one or more available carriers, and
   wherein the message comprising the MCI is received through a primary carrier among the one or more available carriers.

2. The method according to claim 1, wherein the message comprising the MCI further comprises a field indicating a number of the one or more available carriers included in the multicarrier configuration.

3. The method according to claim 2, wherein the information about multicarrier capabilities supportable by the MS comprises a parameter related with a bandwidth which is supported by the MS.

4. The method according to claim 1, wherein the frequency shift value is applied over adjacent carriers of the one or more available carriers to align overlapped subcarriers between the one or more available carriers.

5. The method according to claim 4, wherein the MS transmits and receives data over a guard band between the one or more available carriers.

6. The method according to claim 1,
   wherein each of the one or more available carriers is classified by a center frequency, and
   wherein the message comprising the MCI further comprises center frequency information of the one or more available carriers.

7. A method for negotiating multicarrier capability in a wireless access system supporting a carrier aggregation scheme, the method comprising:
   receiving, by a base station (BS), a registration request (REG-REQ) message from a mobile station (MS) requesting to negotiate the multicarrier capability and register to the BS during a network entry procedure, the REG-REQ message including information about multicarrier capabilities supportable by the MS;
   transmitting, by the BS, a registration response (REG-RSP) message to the MS in response to the REG-REQ message, the REG-RSP message including information about multicarrier capabilities supportable by the BS; and
   transmitting, by the BS, a message comprising a multicarrier configuration index (MCI) which represents a multicarrier configuration and a frequency shift value to the MS,
   wherein the multicarrier configuration indicates bandwidth information for one or more available carriers, and
   wherein the message comprising the MCI is transmitted through a primary carrier among the one or more available carriers.

8. The method according to claim 7, wherein the message comprising the MCI further comprises a field indicating a number of the one or more available carriers included in the multicarrier configuration.

9. The method according to claim 8, wherein the information about multicarrier capabilities supportable by the MS comprises a parameter related with a bandwidth which is supported by the MS.

10. The method according to claim 7, wherein the frequency shift value is applied over adjacent carriers of the one or more available carriers to align overlapped subcarriers between the one or more available carriers.

11. The method according to claim 10, wherein the MS transmits and receives data over a guard band between the one or more available carriers.

12. The method according to claim 7,
   wherein each of the one or more available carriers is classified by a center frequency, and
   wherein the message comprising the MCI further comprises center frequency information of the one or more available carriers.

13. A mobile station (MS) configured to negotiate multicarrier capability in a wireless access system supporting a carrier aggregation scheme, the MS comprising:
   a transmission module;
   a reception module; and
   a processor supporting negotiation of the multicarrier capability,
   wherein the MS is configured to:
   transmit, to a base station (BS), a registration request (REG-REQ) message to negotiate the multicarrier capability and register to the BS during a network entry procedure by using the transmission module, the REG-REQ message including information about multicarrier capabilities supportable by the MS;
   receive, from the BS, a registration response (REG-RSP) message in response to the REG-REQ message by using the reception module, the REG-RSP message including information about multicarrier capabilities supportable by the BS; and
   receive, from the BS, a message comprising a multicarrier configuration index (MCI) which represents a multicarrier configuration and a frequency shift value by using the reception module,
   wherein the multicarrier configuration indicates bandwidth information for one or more available carriers, and wherein the message comprising the MCI is received through a primary carrier among the one or more available carriers.

14. The mobile station according to claim 13, wherein the message comprising the MCI further comprises a field indicating a number of the one or more available carriers included in the multicarrier configuration.

15. The mobile station according to claim 14, wherein the information about multicarrier capabilities supportable by the MS comprises a parameter related with a bandwidth which is supported by the MS.

16. The mobile station according to claim 13, wherein the frequency shift value is applied over adjacent carriers of the one or more available carriers to align overlapped subcarriers between the one or more available carriers.

17. The mobile station according to claim 16, wherein the MS transmits and receives data over a guard band between the one or more available carriers.

18. The mobile station according to claim 13,
wherein each of the one or more available carriers is classified by a center frequency, and
wherein the message comprising the MCI further comprises center frequency information of the one or more available carriers.

19. A base station (BS) configured to negotiate multicarrier capability in a wireless access system supporting a carrier aggregation scheme, the BS comprising:
a transmission module;
a reception module; and
a processor supporting negotiation of the multicarrier capability, wherein the BS is configured to:
receive, from a mobile station (MS), a registration request (REG-REQ) message requesting to negotiate the multicarrier capability and register to the BS during a network entry procedure by using the reception module, the REG-REQ message including information about multicarrier capabilities supportable by the MS;
transmit, to the MS, a registration response (REG-RSP) message in response to the REG-REQ message by using the transmission module, the REG-RSP message including information about multicarrier capabilities supportable by the BS; and
transmit, to the MS, a message comprising a multicarrier configuration index (MCI) which represents a multicarrier configuration and a frequency shift value by using the transmission module,
wherein the multicarrier configuration indicates bandwidth information for one or more available carriers, and
wherein the message comprising the MCI is transmitted through a primary carrier among the one or more available carriers.

20. The base station according to claim 19, wherein the message comprising the MCI further comprises a field indicating a number of the one or more available carriers included in the multicarrier configuration.

21. The base station according to claim 20, wherein the information about multicarrier capabilities supportable by the MS comprises a parameter related with a bandwidth which is supported by the MS.

22. The base station according to claim 19, wherein the frequency shift value is applied over adjacent carriers of the one or more available carriers to align overlapped subcarriers between the one or more available carriers.

23. The base station according to claim 22, wherein the MS transmits and receives data over a guard band between the one or more available carriers.

24. The base station according to claim 19,
wherein each of the one or more available carriers is classified by a center frequency, and
wherein the message comprising the MCI further comprises center frequency information of the one or more available carriers.

* * * * *